Patented May 26, 1953

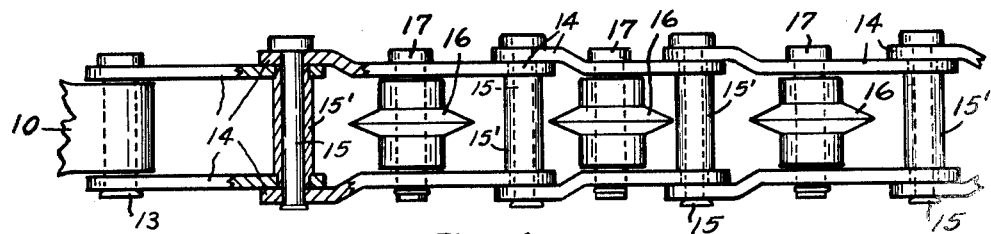
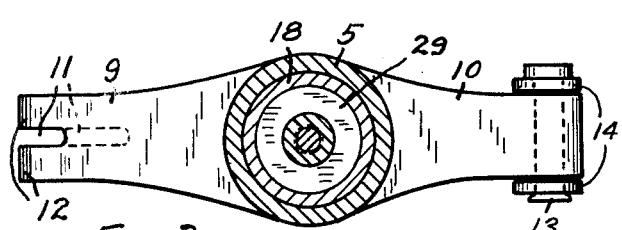
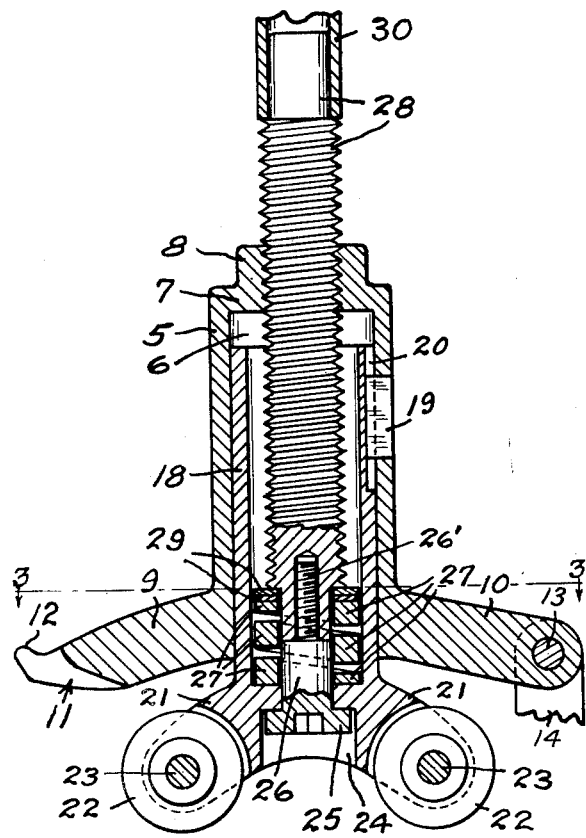
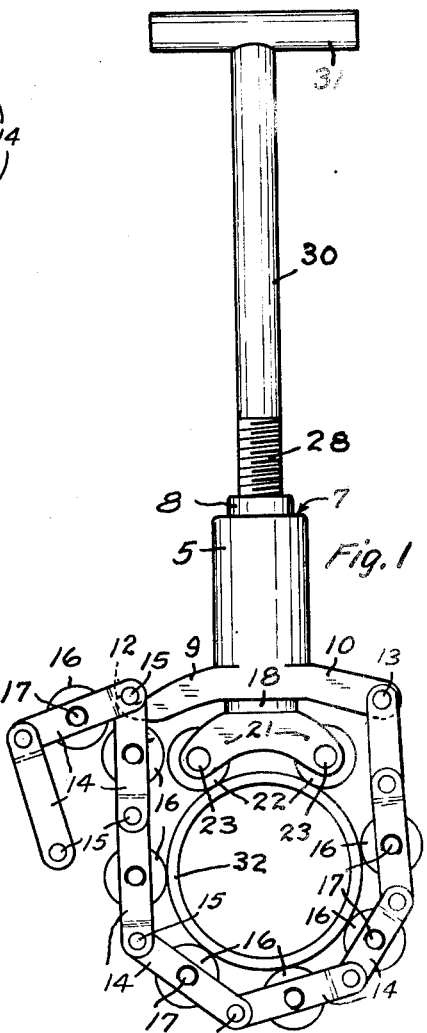

2,639,501

UNITED STATES PATENT OFFICE 2,639,501

PIPE CUTTER

Elmer C. Harding, Seattle, Wash., assignor to Spring Load Pipe Cutter Mfg. Corp., Seattle, Wash., a corporation of Washington Application December 5, 1947, Serial No. 789,967

4 Claims. (Cl. 30—102)

This invention relates to pipe cutters of a type used for cutting cast iron pipe and having a chain provided with rotary cutting members.

An object of this invention is to provide a pipe cutter of this type in which the cutting is done by rotatively mounted circular cutter members, some of said cutter members being carried by a chain that is connected with a main frame member and extends around a pipe and some of said cutter members being carried by a cutter carrying member that is slidable in the main frame and resiliently supported against a compression spring.

Another object is to provide a cast iron pipe cutter in which a compression spring is used in such a manner that it will resiliently support the cutting members in the first and last stages of the cutting operation, thereby insuring a straight clean cut, and will provide non-resilient support for said cutting members during the intermediate stages of the cutting operations thereby making it possible to speed up the cutting operation.

Another object is to provide a cast iron pipe cutter in which the cutter members are resiliently supported so as to compensate for irregularities on the periphery of the pipe in the path of the cutters thereby minimizing waste by avoiding damage to the pipe and damage to the cutter members.

Another object is to provide a cast iron pipe cutter that can be operated in places which afford a minimum amount of room, such as in corners, between studding or joists, in trenches and the like.

Another object is to provide a pipe cutter in which the pressure on the cutting members can be adjusted while the cutter is in operation.

Another object is to provide a pipe cutter for use in cutting cast iron pipe, such as soil pipe, which can be applied very close to the end of a pipe without danger of breaking or shattering the pipe and one which will make a smooth straight cut at right angles to the pipe so that a pipe thus cut will be easy to position and align relative to another piece of pipe to which it is to be connected and the work of assembling and caulking a joint will be facilitated and speeded up.

Other objects are to provide a pipe cutter for cast iron pipe which is strong and durable in construction and not expensive to manufacture, which is very rapid in its cutting thereby saving time and minimizing the cost of cutting pipe, and one which will make a straight clean cut across the pipe without danger of cracking the pipe thereby minimizing waste of pipe and insuring better pipe joints.

Other objects of this invention will be apparent from the following description and accompanying drawings.

In the drawings Figure 1 is a view in elevation of a pipe cutter constructed in accordance with this invention showing the same applied to a pipe.

Fig. 2 is a vertical sectional view, on a larger scale than Fig. 1, of this pipe cutter parts being shown in elevation and parts of the cutting chain and handle being broken away.

Fig. 3 is a view in cross section with parts in plan taken substantially on broken line 3—3 of Fig. 2.

Fig. 4 is a detached fragmentary plan view showing a portion of a cutting chain, parts being shown in section.

Like reference numerals designate like parts throughout the several views.

This pipe cutter comprises a main frame or housing member 5 having an internal chamber 6, preferably of cylindrical shape. One end portion of the main frame member 5 has an integral end wall 7 provided with an axially disposed, perforated, internally threaded hub member 8. The other end of said frame member 5, shown at the bottom of Figs. 1 and 2, does not have any end wall but is provided with two relatively strong diametrically opposite, outwardly extending bracket arms 9 and 10 which are integral with or rigidly secured to said main frame 5.

The outer end portion of the bracket arm 9 has a groove 11 therein and is provided with upwardly protruding pin engaging members 12. The outer end portion of the other bracket arm 10 is transversely perforated for the reception of a pivot pin 13 by which the end link members of a cutting chain are pivotally secured to said arm 10. Each link of the cutting chain is made up of two spaced apart link members 14 and adjacent chain links are pivotally connected with each other by cross pins 15. Preferably the first chain link, namely the link that is connected with the pivot pin 13, and the third chain link remote from the pivot pin 13 are shorter than the remainder of the links in order to secure the best possible cutting action on pipes of standard size. Satisfactory results have been obtained by making said shorter first and third links about two inches in length between the centres of their pivots and by making all of the other links about two and three fourths inches in length between the centers of their pivots.

A plurality of circular pipe cutting members 16, commonly called rotary wedges, because they have cutting edges of wedge shaped cross section, are disposed between the side link members 14 of a plurality of the chain links and are rotatively supported on bearing pins or axles 17. Preferably the bearing pins 17 on which the pipe cutting members 16 are supported are removable so that the cutting members 16 can be replaced in the event they are damaged or become too dull.

A tubular cylindrical cutter carrying member 18 is slidably disposed in the main housing member 5. A key or spline 19 is rigidly connected with the housing 5 and operates in a keyway 20 in the cutter carrying member 18 to prevent relative rotary displacement of the main frame 5 and cutter carrying member 18.

One end portion of the cutter carrying member 18 protrudes beyond the housing 5 and has two oppositely disposed outwardly directed forked bearing brackets 21 within which two rotary circular pipe cutting members 22 are journaled on axle pins 23. The pipe cutting members 22 are similar to the pipe cutting members 16 hereinbefore described.

The end of the cutter carrying member 18 which is shown at the bottom in Fig. 2 has a recess 24 for the reception of the head 25 of a shoulder bolt or screw 26 which has a threaded end portion 26'. The bolt 26 extends through the end of the member 18 and into the chamber within said member 18. A suitable recess is provided in the bolt head 25 for the reception of a tool by which said bolt can be turned.

A relatively strong, helical compression spring 27 is provided within the cutter carrying member 18 and the bolt 26 extends through this spring 27. A handle member 28 is threaded through the hub 8 on the end wall 7 of the main frame or housing 5 and extends into the member 18. The threaded portion 26' of bolt 26 is threaded into the end of this handle member 28. Preferably two washers 29 of polished metal are provided between the end of the spring 27 and a shoulder on the handle member 28 for the purpose of reducing friction at this location and to provide a support for the end of the spring 27.

An outer handle member 30, preferably of tubular construction to minimize weight, is welded or otherwise fixedly secured to the handle member 28. A cross bar 31 is preferably provided on the outer end of the handle member 30 to facilitate turning the members 30 and 28. The bolt 26 will always turn with the handle member 28 because of the frictional engagement of the threads of said bolt 26 in said handle member 28. Also the shoulder of the bolt 26 jams against the end of the handle member 28 and further insures the locking together of these two parts. The bolt 26 holds the spring 27 under a desired pressure or compression. This bolt 26 is free to slide in the hole through which it passes in the end of the cutter carrying member 18. The coils of the spring 27 are relatively close together and are adapted to close and form a solid support during certain phases of the cutting operation.

In the operation of this cast iron pipe cutter the rotary cutter members 22 in the head of the cutter carrying member 18 are placed on a suitably supported cast iron pipe 32 at the location where the pipe is to be cut. The chain which carries the rotary cutter members 16 is drawn around the pipe 32 and a proper cross pin 15 of said chain, depending on the size of the pipe 32, is hooked over the pin engaging members 12 of the main frame or housing. The handle 31, 30, 28 is then axially rotated in the proper direction to bring the two cutting members 22 and a number of the cutting members 16 into relatively light, spring loaded, cutting engagement with the pipe 32. The tool is then oscillated relative to the pipe 32 through a sufficient angle to make a light cut entirely around the pipe with all of the cutting members backed up by the resilient pressure of the spring 27. If the pipe is of uneven contour and has high spots the cutting members can yield when they encounter these high spots and will cut deeper at the location of the high spots but there will be no damage to the pipe or to the cutters. In this way a small straight parting cut which is free from high spots can be formed on the periphery of the pipe.

After a correct initial parting cut has thus been set up the handle is further rotated to increase the pressure on the cutters, and the tool is oscillated on the pipe to deepen the parting cut until the pipe parts evenly and smoothly at the location of the cut. The spring 27 is constructed so that its coils will close and abut together when subjected to heavy pressure. Thus after the initial parting cut has been made and the high and uneven spots in this cut smoothed out the spring can be entirely compressed and any desired pressure used in the intermediate stages of the cutting.

When the final parting of the pipe commences the resilience of the spring 27 will always become operative, irrespective of whether or not the coils of this spring have been entirely closed. This even spring pressure will be exerted entirely around the pipe at the time of the final parting so that the parting is true and even.

The spring cushioning or loading of the cutting members is important in that it functions at the beginning of the cutting operation to provide a true, straight starting cut and to protect both the pipe and the tool against damage due to uneven spots on the periphery of the pipe and it functions in the final stages of the cutting operation to secure a true and even parting of the pipe. During the intermediate stages of the cutting operation the coils of the spring 27 can be entirely closed to provide higher pressure and make possible faster cutting.

It has been found that the spring loading of the cutting members, as hereinafter explained, greatly speeds up the work of cutting cast iron pipe such as soil pipe, that it greatly reduces the danger of breaking the pipe even when the tool is used by an unskilled operator and that it results in better cutting of the pipe and thereby facilitates the making of better pipe joints.

This cutter is primarily adapted for cutting cast iron pipe but it will be understood that the same can be used for cutting other kinds of pipe.

The foregoing description and accompanying drawings clearly disclose a preferred embodiment of this invention but it will be understood that this disclosure is merely illustrative and that changes may be made within the scope of the following claims.

I claim:

1. A pipe cutter for cutting cast iron pipe comprising a main frame; a cutter carrying member slidably supported by and longitudinally movable relative to said main frame and having two spaced apart aligned circular cutter members rotatively mounted thereon; a handle threaded into said main frame and having a shoulder adjacent its inner end; a compression spring interposed between said shoulder and said cutter carrying member; axially positioned bolt means connecting said cutter carrying member with said handle and holding said spring under compression, said cutter carrying member being slidable on said bolt means, whereby longitudinal movement of said cutter carrying member relative to said handle is provided; and pipe engaging means positioned in opposed relation to said cutter members and connected with said main frame.

2. A pipe cutter for cutting cast iron pipe comprising a main frame; a cutter carrying member slidably supported by said main frame and having two spaced apart aligned circular cutter members rotatively mounted thereon; a handle threaded into said main frame and providing a shoulder adjacent its inner end; a compression spring interposed between the shoulder provided by said handle and said cutter carrying member, the coils of said compression spring being relatively closely wound whereby said coils can abut together and provide a solid support between said handle and said cutter carrying member in the operation of the tool; bolt means connecting said cutter carrying member with said handle and holding said spring under compression, said cutter carrying member being slidable on said bolt means; and pipe engaging means positioned in opposed relation to said cutter members and connected with said main frame.

3. A pipe cutter for cutting cast iron pipe comprising a main frame; a cutter carrying member slidably supported by said main frame and having two spaced apart aligned circular cutter members rotatively mounted thereon; a handle threaded into said main frame, the inner end portion of said handle being shaped to form a shoulder; a compression spring interposed between said shoulder and said cutter carrying member; anti-friction bearing means provided between the shoulder on said handle member and said spring; axially positioned bolt means connecting said cutter carrying member with said handle and holding said spring under compression, said cutter carrying member being slidable on said bolt means, whereby longitudinal movement of said cutter carrying member relative to said bolt means and said main frame member is provided; and pipe engaging means positioned in opposed relation to said cutter members and connected with said main frame.

4. A pipe cutter for cutting cast iron pipe comprising a hollow cylindrical main frame member; two bracket arms rigid with said main frame member and extending outwardly therefrom in opposite directions adjacent one end thereof; a hollow cylindrical cutter carrying member slidably disposed in said main frame member; spline means interconnecting said main frame member and said cutter carrying member preventing relative rotary movement thereof; two spaced apart aligned circular cutter members rotatively mounted on said cutter carrying member; an axially positioned handle threaded into said main frame member, the inner end portion of said handle being shaped to form a shoulder; a compression spring interposed between the shoulder of said handle and said cutter carrying member; axially positioned bolt means connecting said cutter carrying member with said handle, said bolt means being slidable in said cutter carrying member, whereby longitudinal movement of said cutter carrying member relative to said handle and said main frame is provided; and pipe engaging means positioned in opposed relation to said cutter members and connected with said main frame.

ELMER C. HARDING.

References Cited in the file of this patent

UNITED STATES PATENTS

| Number | Name | Date |
|---|---|---|
| 775,581 | Rothenbucher | Nov. 22, 1904 |
| 782,226 | Ellis | Feb. 14, 1905 |
| 1,040,202 | Howe | Oct. 1, 1912 |
| 1,380,653 | Kilgour | June 7, 1921 |
| 1,428,712 | Sanders | Sept. 12, 1922 |
| 1,897,374 | Goebel | Feb. 14, 1933 |
| 1,963,891 | Diver | June 19, 1934 |